May 23, 1933.　　H. W. HILL ET AL　　1,911,154
OPHTHALMIC LENS
Filed Dec. 24, 1930
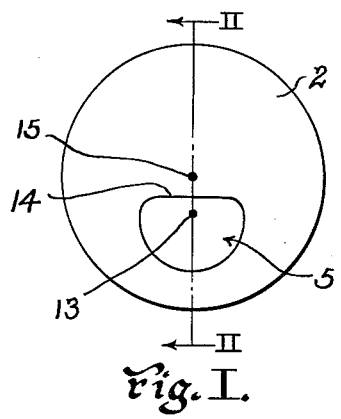
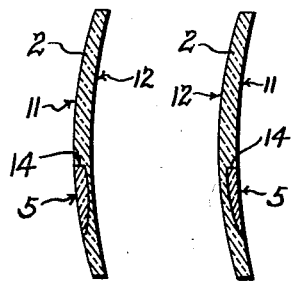
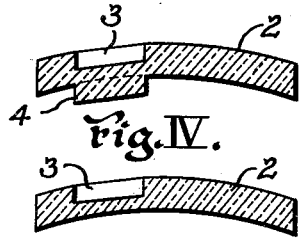
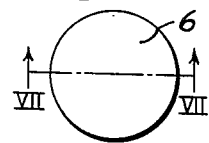
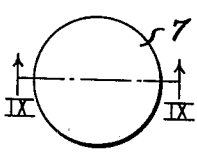
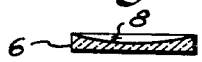
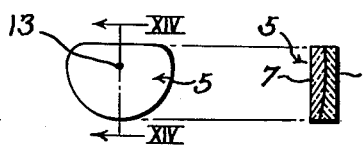
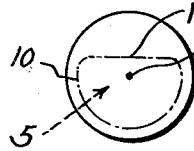
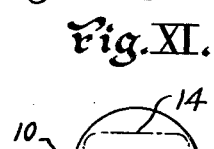
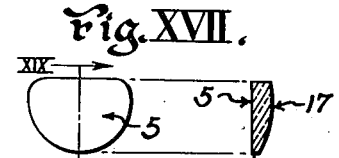
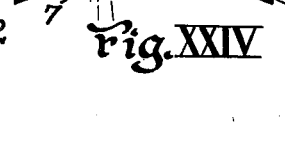
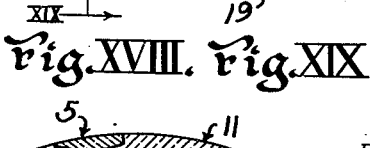
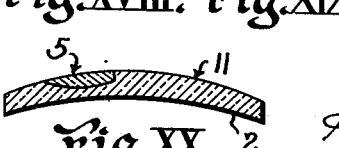
INVENTOR
HARRY W. HILL.
EDGAR D. TILLYER.
BY Harry H. Styll
ATTORNEY Patented May 23, 1933

1,911,154

UNITED STATES PATENT OFFICE

HARRY W. HILL AND EDGAR D. TILLYER, OF SOUTHBRIDGE, MASSACHUSETTS, ASSIGNORS TO AMERICAN OPTICAL COMPANY, OF SOUTHBRIDGE, MASSACHUSETTS, A VOLUNTARY ASSOCIATION OF MASSACHUSETTS

OPHTHALMIC LENS

Application filed December 24, 1930. Serial No. 504,447.

This invention relates to improvements in ophthalmic lenses and has particular reference to an improved bifocal or multifocal lens and process of making same.

The principal object of the invention is to provide improved and less expensive means of producing lenses embodying fusion processes, by substituting molding processes for certain of the more expensive grinding and polishing operations hitherto employed without detracting from the excellence of the finished lenses.

Another object of the invention is the production of a fused multifocal or bifocal lens wherein the objectionable and harmful edge reflections of the fused segment are maintained at a minimum.

Another object of the invention is to provide improved means for producing a fused bifocal or multifocal lens embodying the use of molding operations for forming the segment and the segment recess so that either a feather or thin edge segment or a thick edge segment may be used.

Another object of the invention is to provide improved means for making a molded segment recess portion having reinforcement so located that the optical properties of the glass material is not destroyed in the molding, pressing or fusing operations.

Another object of the invention is to provide improved and less expensive means of producing a segmental button for a fused bifocal or multifocal lens.

Another object of the invention is to provide improved means of making a segment for a fused multifocal or bifocal lens of irregular or unsymetrical shape or contour.

Other objects are the provision of means for controlling the size, shape and optical center of the segments of such lenses, for controlling the position of the dividing line of the segment, for controlling the amount and position of prism correction in the segment, for reducing the cost and difficulty of fusing the dividing line, for utilizing the combinations of the prior art as regards glasses of different indices of refraction, disperison and expansion and for obtaining all of the various prior advantages of lenses of this character by simpler and less expensive means.

Other objects and advantages of this invention will become apparent from the following description taken in connection with the accompanying drawing and it will be understood that many changes may be made in the details of construction, arrangement of parts and the steps of the process without departing from the spirit of the invention as expressed in the accompanying claims. We, therefore, do not wish to be limited to the exact details of construction and steps of the process shown and described as the preferred forms only have been given by way of illustration.

Referring to the drawing:

Fig. I is a front elevation of a finished lens embodying the invention.

Fig. II is a section on line II—II of Fig. I, showing the segment on the convex side of the lens;

Fig. III is a view similar to Fig. II, showing the segment on the concave side of the lens;

Fig. IV is a sectional view of a semi-finished lens blank showing a portion thereof displaced to form a depression therein;

Fig. V is a view similar to Fig. IV showing the displaced portion of the semi-finished lens blank removed;

Fig. VI is a front elevation of a disc of glass employed in forming the reading segment of the lens;

Fig. VII is a sectional view taken on line VII—VII of Fig. VI;

Fig. VIII is a view similar to Fig. VI of another disc of glass employed in forming the reading segment of the lens;

Fig. IX is a sectional view taken on line IX—IX of Fig. VIII;

Fig. X is a sectional view showing the discs of glass illustrated in Figs. VII and IX united together;

Fig. XI is a diagrammatic view illustrating a step in the process of manufacture;

Fig. XII is a view similar to Fig. XI;

Fig. XIII is a front elevation of the segment or reading addition;

Fig. XIV is a sectional view taken on line XIV—XIV of Fig. XIII;

Fig. XV is a sectional view showing the segment illustrated is cross section in Fig. XIV positioned within the depression in the major portion of the lens blank shown in Fig. V;

Fig. XVI is a sectional view of the semi-finished lens;

Fig. XVII is a sectional view similar to Fig. V showing a modified form of the invention;

Fig. XVIII is a front elevation of a modified form of segment for the reading addition;

Fig. XIX is a sectional view taken on line XIX—XIX of Fig. XVIII;

Fig. XX is a sectional view taken on line segment illustrated in Fig. XIX in position in the major lens blank illustrated in Fig. XVII and showing the segment side of the lens finished with a continuous curve;

Fig. XXI is a sectional view of a further modification of the invention;

Fig. XXII is a front elevation of another modified form of segment;

Fig. XXIII is a sectional view on line XXIII—XXIII of Fig. XXII; and

Fig. XXIV is a sectional view showing the segment illustrated in cross section in Fig. XXIII positioned within the recess in the major portion of the lens blank shown in Fig. XXI and illustrating in dot and dash lines how the lens is formed from the major blank.

In the past fused bifocal or multifocal lenses have been made with very desirable and efficient segments having a substantially straight upper edge and a circular lower contour. These segments were made of two pieces of glass of different indices of refraction fused along the so called straight edge of the segment but great difficulty was found in the fusing of this edge. The percentage of waste was exceedingly high and the quality of the fused edge very poor. It is therefore one of the prime objects of this invention to provide means whereby this fusing difficulty is avoided.

There have also been produced in the prior art two types of fused lenses of this character one having the lower circular portion of the segment of a knife or feathered edge and the other having the said edge of an appreciable thickness. Our invention may be employed with equal facility for either type of lens desired.

Referring to the drawing wherein similar reference characters denote corresponding parts throughout: In Figures I to XVI inclusive we have shown our invention as applied to the production of a segment for a fused multifocal or bifocal lens having its lower circular outline of either the feathered edge type or of the thick edge type as desired. In Figures XVII to XX inclusive we have shown it applied to a segment of the thin or feathered edge type and in Figures XII to XXIV inclusive we have shown it applied to a segment having its edges of an appreciable thickness.

In Fig. IV, we have shown a blank for a lens having a major portion 2 preferably of crown or other glass having a low index of refraction. This major portion 2 is preferably made by pressing the same in a plastic condition in a mold. Into one surface of this major portion, while it is plastic from heat, is pressed or made the recess or depression 3 of the desired contour and size of the reading segment by means of a plunger die having the required outline shape and dimensions. It will be noted that on the side opposite the recess or depression 3 is a projection or exuberance 4, and also that the depression 3 does not extend entirely through the major portion 2. The major portion 2 is made with the projection 4 in order that during the operation of forming the recess or depression 3 particles of the material of the glass are moved or displaced sensibly parallel with their former positions, whereas if the projection was not used and the underside or projection side left flat there would be a tendency for the displaced glass to spread laterally and cause the particles of glass to be curled or displaced out of parallelism and produce irregularities in the blank which would be visible at times and appear as lines, seams, veins, cords, cracks and defects which would destroy the value of the lens.

Particular attention is directed to the fact that the depression does not go all the way through the major portion 2 as the shape and outline of the depression could not be so well controlled and the sides of the recess would not be so smoothly finished. After the blank 2 has been formed the projection 4 is removed as shown in Fig. V by grinding or other means.

The reading addition or segment 5 of the lens is preferably formed of two pieces of glass 6 and 7 of different indices of refraction. The portion 6 is of sensibly the same index of refraction as the major portion 2 and is preferably provided with a concave surface 8 on one side therof, the radius of which is dependent upon the power of the reading addition desired. The portion 7 is made of glass of a higher index of refraction than that of the major blank 2 such as flint or barium crown glass, etc., and is provided with a convex surface 9 on one side thereof of substantially the same curvature as the concave surface 8 and is united by fusing with the said surface as shown in Fig. X. The united pieces 6 and 7 are then cut along the dot and dash lines 10 as shown in Figs. XI and XII to the size and contour shape of the depression 3 with suitable allowances for clearances or to any desired contour shape of segment.

The composite segment 5 is then placed in the depression 3 and is fused therein as shown in Fig. XV. The portion of glass 6 which is sensibly of the same index of refraction as the major portion 2 blends with the major portion during the fusion operation and disappears leaving only the portion 7 of a different refractive index visible. A curve 11 is then formed on the segment side of the blank to any desired curvature depending upon the distance power required. This removes the excess glass from that side of the lens blank and prepares it for commercial use. The curve 11 and segment 5 are shown in Fig. II as being placed upon the convex side of the lens and in Fig. III as being placed on the concave side of the lens, it being understood that either side can be used. The lens is then finished by placing the desired curve on the opposite face 12 of the lens.

It is apparent that the size and shape of the reading segment can be controlled during the forming of the depression 3 and the segment 5, it being simply necessary to employ different shaped molding dies and different shaped segments 5 to fit the recesses or depressions 3 formed by said dies. The position of the optical center 13 of the reading segment 5 may be controlled during the forming of said segment as shown in Figs. XI and XII. By cutting the segment out of the lower portion of the composite pieces of glass 6 and 7 as shown in Fig. XI the optical center 13 will be nearer the top or dividing line 14 of the segment and by cutting it nearer the top as shown in Fig. XII it will be further away from the dividing line or nearer the bottom of the segment. It is quite apparent that the center 13 can likewise be placed to the right or left of the vertical meridian of the segment if desired. This provides means for controlling the prism power of the segment.

The position of the dividing line 14 with respect to the optical center 15 of the major lens blank 2 is controlled during the forming of the depression 3 in said major blank. If it is desired to have the dividing line 14 closer to the center 15 the depression is formed closer to said center and if it is desired to have it positioned further away from the center the depression is formed nearer the peripheral edge of the blank.

The segment 5 in this instance may be formed to a feathered edge or may be formed with an edge having an appreciable thickness. This is controlled by the depth to which the curve 11 is formed and by the position at which the optical center 13 of the segment is placed. The most desirable edge in the finished lens is the feathered type as there are less reflections of light from such an edge than there are from a thick edge. The feathered edge type being reflective only on the straight top edge whereas the thick edged type has reflections all around. This absence of reflections is a very desirable consideration in the greater number of finished lenses that are provided for the market and is usually not departed from unless for some other special requirement not obtainable with the thin edge segment as will be pointed out herein below.

It will be noted that the line 14 may be shaped to practically any desired contour and that this shape will be kept throughout all the operations of production. An irregular contour shape of segment that is difficult or even impossible to grind may be formed in this way and smooth fusion edges may be obtained.

In Figures XVII to XX inclusive there is shown a slight modification wherein the depression 3 is formed with a curved under surface 16 of the required radius to produce the reading power desired. In this instance the segment 5 is formed from a single piece of high index glass such as flint or barium crown glass which is molded while in a plastic state to the size and shape of the recess 3. A curve 17 of substantially the same radius as the depression curve 16 is formed on one face of the segment as shown in Fig. XIX. The segment 5 is placed in the depression 3 and is fused therein. A continuous curve 11 is then formed on the segment side of the lens as previously described to prepare the lens for commercial use. This arrangement forms a feather edge type of segment, if desired, the center of which is controlled by the angle at which the curve 16 is formed in the depression 3. The thin edge is controlled by the operator and is well understood and largely employed in the prior art. A thick edge segment lens blank can also be made in this way by having a thick edge 19, see Fig. XIX and providing for the same in the depression in the major portion of the blank.

In Figures XXI to XXIV inclusive there is shown a further modification wherein a recess 18 is formed in the major blank 2. This recess is formed to the size and shape desired by any suitable method known in the art such as moulding or pressing it therein when the major blank is in a plastic state or by cutting, grinding and etc.

The segment 5 is formed to the shape and size of the recess 18 in a manner similar to that shown in Figures VI to XIV inclusive only in this instance the portions 6 and 7 are slightly thicker. The segment 5 is then fused in the recess as shown in Fig. XXIV.

The increased thickness of the portions 6 and 7 is to provide means whereby the amount and location of prism correction of the segment may be controlled without changing the size and shape of the segment. The amount of displacement and position of the optical center of the segment may be controlled during the forming of the segment as shown in Figs. XI and XII or may be controlled as shown in Fig. XXIV by the angular relationship of the curves 11 and 12 to the segment 5. The position of the optical center with relation to the center of the major blank may also be controlled in these ways. A thick edged segment may be produced as is often times necessary in order to introduce the desired prism correction in the segment of the required amount and in the required position, as is well understood in the prior art. Such thick edge segments maintain their size and shape during the surfacing of the segment face of the lens until such edges have been ground through. Hence no outside control of the size and shape of the segment is needed other than not to grind entirely through the thickness of the segment. Where segments with thin edges are used an outside control by the operator is necessary but is well understood and largely employed in the prior art.

The portions of glass 6 and 7 employed in forming the segment shown in Figs. XXII and XXIII are the same as that used for the segment shown in Figs. XIII and XIV.

In all of the instances described above, during the forming of the major portion 2 with the recess or depression 3 and while the major portion is still at a high temperature a gaub of plastic glass of a high index of refraction may be placed in the recess or depression and pressed therein until it assumes the size and shape of the depression and is fused therein. This obviates the shaping and sizing of the segment previous to its being fused in the recess or depression in the major portion 2 and greatly reduces the cost of manufacture.

By referring to Figs. XVIII and XIX it is clear that a composite segment may also be made to the outline shape of the depression without a cutting operation such as shown in Figs. VI to XIV inclusive, constituting a saving of considerable time and cost of production.

Any combinations of glass known to the prior art may be used, keeping in mind the index of refraction for power, the dispersion for color considerations, the melting temperatures for fusion and the expansion for fusion.

It will be understood that in all instances the portion of the button which is of sensibly the same index of refraction as the major portion will blend with the said major portion when fused thereto and disappear leaving only the portion of a different index of refraction visible.

The shapes set out in the drawing are simply by way of illustration of how various shaped segments can be obtained and how segments of varying sizes may be obtained and are not intended to restrict applicant in any way to the particular shape or size of segments shown, as with this method practically any desired shape may be made.

As stated above the center of the reading addition may be placed in any desired relation with respect to the center 15 of the major portion 2 and the dividing line 14 may be located in any desired relation with respect to the center 15 of the major portion and the center 13 of the reading addition.

It will be understood that wherever the term "multifocal" is employed in the specification or claims herein, that it refers to a bifocal lens as well as other lenses having more than one focal field. It will also be understood that the use of the invention and device described herein will be mainly in connection with bifocal lenses, the greater bulk of the lenses to which this invention will be applied being bifocal lenses; only a small percentage will be trifocals or lenses of more than two focal fields.

From the foregoing it will be seen that there have been provided simple, efficient and economical means for obtaining all of the advantages of the invention.

Having described our invention we claim:

1. A blank for an ophthalmic lens comprising a major portion of glass of one index of refraction and having a depression therein, the walls and bottom of said depression being substantially straight and a button fused in said depression, said button comprising superimposed layers of glass of different indices of refraction, having substantially the same contour shape as the depression and relatively thick substantially straight edges adapted to engage with the walls of the depression, the lower layer being the same index as the major portion and the surfaces between the two layers being curved to the required power curve.

2. An ophthalmic lens comprising a major portion of glass of one index of refraction and having a depression therein, the walls and bottom of said depression being substantially straight and a button fused in said depression, said button comprising superimposed layers of glass of different indices of refraction, having substantially the same contour shape as the depression and relatively thick substantially straight edges adapted to engage with the walls of the depression, the lower layer being the same index as the major portion and the surfaces between the two layers being curved to the required power curve, a continuous curve over the face of the piece of glass having the depression and the exposed face of the button and a continuous curve over the opposite face of the piece of glass having the depression.

3. A blank for an ophthalmic lens comprising a major portion of glass of one index of refraction and having a depression therein and a button fused in said depression, said button comprising superimposed layers of glass of different indices of refraction, the lower layer being of sensibly the same index as the underlying major portion of glass, said underlying major portion of glass being that portion of the major piece of glass which originally occupied the depressed area.

4. A blank for an ophthalmic lens comprising a piece of glass of one indext of refraction having a depression in one side thereof of the size and shape of the reading segment of the lens and having side walls of substantially the same depth throughout and a bottom formed with a curved surface of the desired radius, said piece of glass having a displaced projecting portion on the side thereof opposite the depression formed by glass displaced from said depression area and a segment of glass of substantially the same contour shape as the depression fused in said depression.

5. A blank for an ophthalmic lens comprising a piece of glass of one index of refraction having a depression in one side thereof of the size and shape of the reading segment of the lens and having side walls of substantially the same depth throughout, said piece of glass having a portion thereof displaced from the depression area and forming a projection on the side thereof opposite the depression, and a segment of glass of substantially the same contour shape as the depression and of a different index of refraction than the first portion and fused in said depression.

6. A blank for an ophthalmic lens comprising a piece of glass of one index of refraction having a depression in one side thereof of the size and shape of the reading segment of the lens and having side walls of substantially the same depth throughout and a bottom formed to substantially the same thickness throughout its area, and a reading segment composed of superimposed layers of glass of different indices of refraction fused in said depression, one of said layers being of the same index of refraction as the portion having the depression therein and having a surface engaging the surface of the bottom of said depression, and the surfaces between the said layers of the reading segment being curved to a required power curvature.

7. A blank for an ophthalmic lens comprising a piece of glass of one index of refraction having a depression in one side thereof of the size and shape of the reading segment of the lens and having side walls of substantially the same depth throughout and a bottom formed with a substantially flat surface and being of substantially the same thickness throughout its area, and a reading segment composed of superimposed layers of glass of different indices of refraction fused in said depression, one of said layers being of the same index of refraction as the portion having the depression therein and having a substantially straight surface engaging the flat surface of the bottom of the depression, and the surfaces between the said layers of the reading segment being curved to required power curvatures.

8. An ophthalmic lens formed from a blank comprising a piece of glass of one index of refraction having a depression in one side thereof of the size and shape of the reading segment of the lens and having side walls of substantially the same depth throughout and a bottom formed to substantially the same thickness throughout its area, and a reading segment composed of superimposed layers of glass of different indices of refraction fused in said depression, one of said layers being of the same index of refraction as the portion having the depression therein and the surfaces between the said layers of the reading segment being curved to required power curvatures, a continuous curve over the face of the piece of glass having the depression therein and the exposed face of the segment in said depression and a continuous curve over the opposite face of the piece of glass having said depression.

HARRY W. HILL.
EDGAR D. TILLYER.